(12) United States Patent
Jiang et al.

(10) Patent No.: US 7,580,688 B2
(45) Date of Patent: Aug. 25, 2009

(54) WEAK BATTERY WARNING CIRCUIT

(75) Inventors: Wu Jiang, Shenzhen (CN); Yong-Zhao Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 534 days.

(21) Appl. No.: 11/434,838

(22) Filed: May 15, 2006

(65) Prior Publication Data

US 2006/0255958 A1    Nov. 16, 2006

(30) Foreign Application Priority Data

May 13, 2005    (CN) .................. 2005 1 0034651

(51) Int. Cl.
  *H04B 1/16*    (2006.01)

(52) U.S. Cl. .................. 455/127.1; 455/343.1
(58) Field of Classification Search .............. None
  See application file for complete search history.

(56) References Cited

U.S. PATENT DOCUMENTS

| 3,392,379 A | * | 7/1968 | Thomason et al. ........ 340/636.1 |
| 5,130,633 A | * | 7/1992 | Maruichi .................... 320/135 |
| 5,794,125 A | * | 8/1998 | Grad ........................ 455/343.1 |
| RE37,281 E | | 7/2001 | Motegi |

* cited by examiner

*Primary Examiner*—Thanh C Le

(57) ABSTRACT

A weak battery warning circuit includes a warning circuit for generating an alarm; a battery having a cathode connected to ground; and a controlling circuit comprising a transistor, the transistor having an emitter for receiving an input voltage, a base connected to an anode of the battery via a base resistor, and a collector connected to the warning circuit and also connected to ground via a collector resistor. When the voltage of the battery reduces to a predetermined value, the controlling circuit controls the warning circuit to alarm.

7 Claims, 2 Drawing Sheets

WEAK BATTERY WARNING CIRCUIT

BACKGROUND OF THE INVENTION

1. Field of the Invention

The present invention relates to a warning circuit, and particularly to a weak, low-voltage battery warning circuit.

2. General Background

A CMOS random access memory (RAM) located on a motherboard of a computer is used to maintain data on hardware configuration of a current system and on settings and parameters such as date, time, hard disk parameters and so on. The CMOS RAM is made using complementary metal oxide semiconductor (CMOS) technology. Typically. chipset manufacturers integrate the CMOS RAM into a real-time clock in an input/output (I/O) Controller Hub. A power supply circuit connected to the real-time clock provides power supply to the CMOS RAM for sustaining the data that the CMOS RAM keeps. Referring to FIG. 3, the power supply circuit 3 of the real-time clock includes an or-gate circuit using diodes D6, D7. When the computer is disconnected from an outer power supply, a battery 5 set on the motherboard provides power to the real-time clock 7. When the computer is connected to the outer power supply, the battery 5 does not provide power to the real-time clock 7 any more and a 3.3V standby voltage from a computer power supply is provided to the real-time clock 7.

After the computer has been left unused for some time and then powered up, an error message may be displayed such as "CMOS check sum error". Such errors may be caused by the battery having become too weak during the unused time, or by the failure of the CMOS RAM. A multimeter can be used to check voltage of the battery to determine its condition. If the voltage measured is too low then the battery should be changed. If the battery is not changed in a timely manner it can leak and pollute the motherboard. However, the foregoing method is wasteful of time and many users may not associate the appearance of error messages with a weak battery. Moreover, by the time the battery is changed according to the scenario above, the battery has already become too weak, so the user has to reset the CMOS parameters.

Currently a warning circuit exists in the motherboard of the computer. The user can diagnose a problem by recognizing a ringing during a power on self test (POST) of the computer. If some failure such as a loose-contact memory, a keyboard controller error, or a loose-contact graphics card happens, the warning circuit makes a warning noise of a predetermined duration to help the user diagnose a problem according to a technical reference manual.

What is needed, therefore, is a weak battery warning circuit which is able to give a warning before the battery becomes weak.

SUMMARY

A weak battery warning circuit is provided for giving a warning before the battery becomes too weak. In a preferred embodiment, the weak battery warning circuit includes a warning circuit for generating an alarm; a battery having a cathode connected to ground; and a controlling circuit comprising a transistor, the transistor having an emitter for receiving an input voltage, a base connected to an anode of the battery via a base resistor, and a collector connected to the warning circuit and also connected to ground via a collector resistor. When the voltage of the battery reduces to a predetermined value, the controlling circuit controls the warning circuit to activate an alarm. It is of advantage that the weak battery warning circuit can alert a user with an alarm before the battery becomes too weak.

Other advantages and novel features will become more apparent from the following detailed description of preferred embodiments when taken in conjunction with the accompanying drawings, in which:

DETAILED DESCRIPTION OF THE EMBODIMENT

Figure 1:
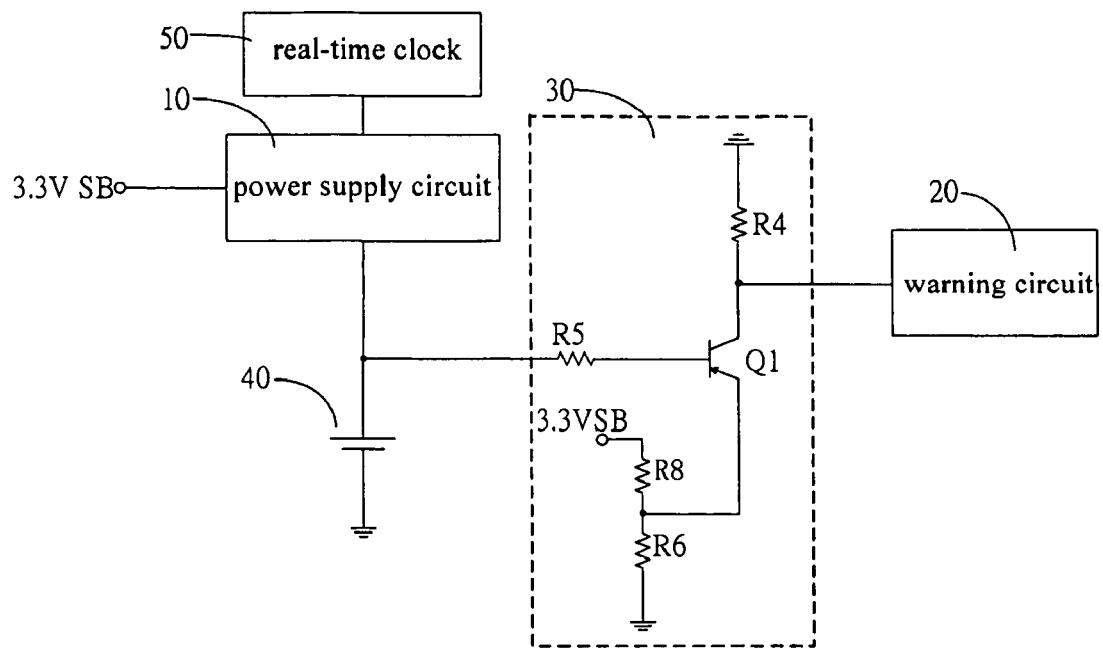
FIG. 1 is a circuit diagram of a weak battery warning circuit in accordance with a first preferred embodiment of the present invention.

FIG. 1 is a circuit diagram of a weak battery warning circuit in accordance with a first preferred embodiment of the present invention. The weak battery warning circuit includes a warning circuit 20, a controlling circuit 30 or called a switch circuit, and a battery 40. The battery 40 has a cathode connected to ground, and an anode connected to a power supply circuit 10. The power supply circuit 10 selects the battery 40 or a 3.3V standby voltage from a computer to provide the real-time clock 50 in the computer with power. The warning circuit 20 activates when any of a predetermined plurality of failures of the computer happens. The controlling circuit 30 includes a transistor Q1, and resistors R6, R8. The resistors R6, R8 are connected in series between the 3.3V standby voltage and ground. The transistor Q1 has an emitter connected to a node between the resistors R6, R8 for receiving an input voltage, a base connected to the anode of the battery 40 via a base resistor R5, and a collector connected to the warning circuit 20 and also connected to ground via a collector resistor R4.

The regular voltage of the battery 40 is about 3V. When the voltage of the battery 40 is less than 2V, a CMOS RAM in the real-time clock 50 will lose data. In order to give an alarm in advance to warn of a weakening battery, the controlling circuit 30 is set to activate when the voltage of the battery 40 reduces to a predetermined value, e.g., 2.1V. When the voltage of the battery 40 is more than 2.1V, a voltage difference between the base of the transistor Q1 and the emitter of the transistor Q1 is less than a break-over voltage of the transistor Q1. The transistor Q1 is thereby off. Thus the controlling circuit 30 outputs a low level voltage to the warning circuit 20, so that an alarm condition does not exist for a weak battery. When the voltage of the battery 40 is less than or equal to 2.1V, the voltage difference between the base of the transistor Q1 and the emitter of the transistor Q1 is more than the break-over voltage of the transistor Q1. The transistor Q1 is thereby turned on. Thus the controlling circuit 30 outputs a high level voltage to the warning circuit 20, controlling the warning circuit 20 to alarm with a durative humming or other known alarm. A user can realize the battery 40 has become weak according to the alarm.

Figure 2:
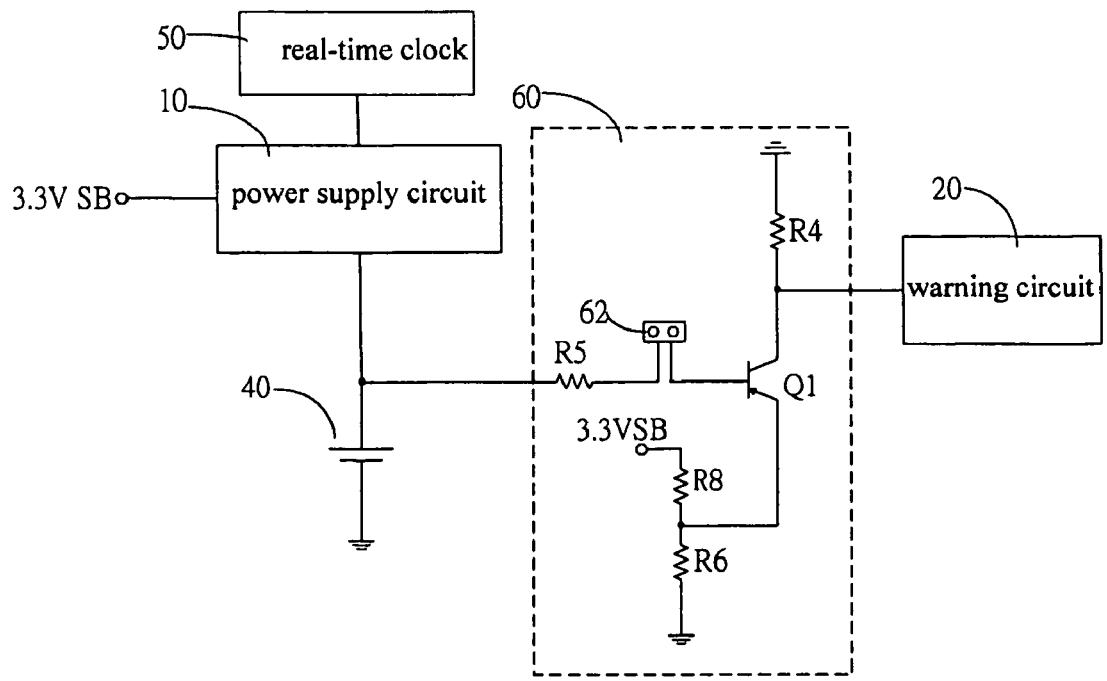
FIG. 2 is a circuit diagram of a weak battery warning circuit in accordance with a second preferred embodiment of the present invention.
Figure 3:
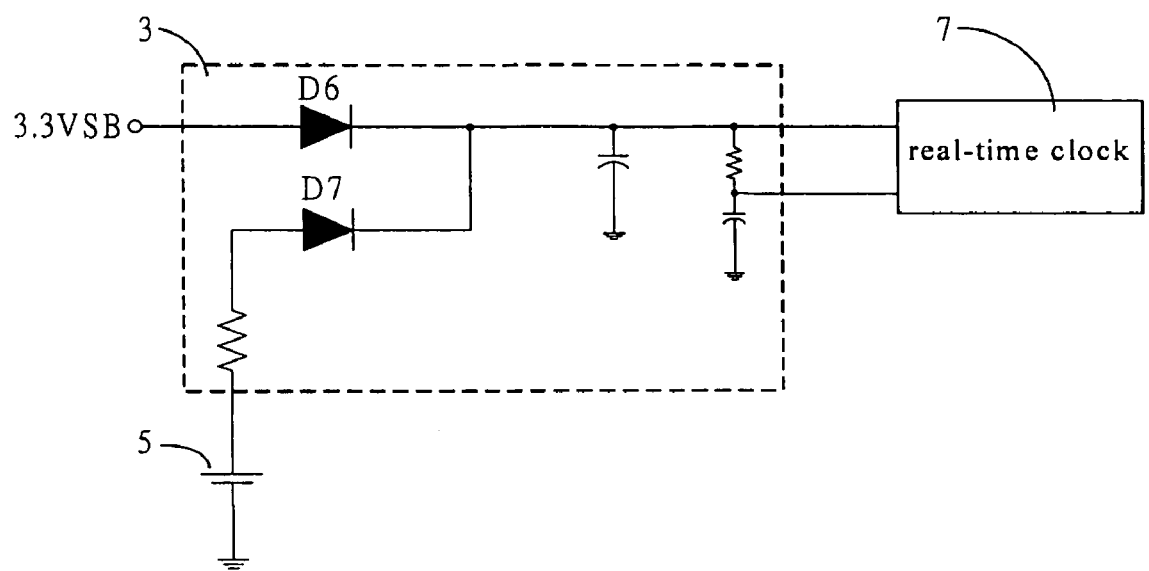
FIG. 3 is a circuit diagram of a power supply circuit of a conventional real-time clock on a motherboard.

FIG. 2 is a circuit diagram of a weak battery warning circuit in accordance with a second preferred embodiment of the present invention. The weak battery warning circuit includes a warning circuit 20, a controlling circuit 60, and a battery 40. The controlling circuit 60 includes a jumper 62 set between the battery 40 and the base of the transistor Q1. Initially the jumper is short-circuited with a shunt (not shown) or some other comparable means. Then the weak battery warning circuit can activate the alarm when the battery 40 becomes weak. Once the user is aware that the battery 40 has become weak, they can disable the weak battery warning circuit silencing the alarm by removing the shunt, thus making the jumper open.

The weak battery warning circuit can be used on other devices, such as backup emergency lamps and motor vehicles having storage batteries.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A weak battery warning circuit comprising:
   a warning circuit for generating an alarm;
   a battery having a cathode connected to ground, and an anode connected to a real-time clock via a power supply circuit, the power supply circuit also connected to a standby voltage from a computer, for selecting one of the battery and the standby voltage to provide power to the real-time clock in the computer; and
   a controlling circuit comprising a transistor, the transistor having an emitter for receiving an input voltage, a base connected to the anode of the battery via a base resistor, and a collector connected to the warning circuit and also connected to ground via a collector resistor, wherein when the voltage of the battery reduces to a predetermined value, the controlling circuit is turned on and controls the warning circuit to alarm.

2. The weak battery warning circuit as claimed in claim 1, further comprises a jumper connected between the base of the transistor and the battery for enabling a user to stop the alarm by setting the jumper open.

3. A weak battery warning circuit comprising:
   a warning circuit for generating an alarm;
   a battery having a cathode connected to ground, and an anode connected to a real-time clock via a power supply circuit, the power supply circuit also connected to a standby voltage from a computer, for selecting one of the battery and the standby voltage to provide power to the real-time clock in the computer; and
   a switch circuit having a first terminal for receiving an input voltage, a second terminal connected to the anode of the battery, and a third terminal connected to the warning circuit, wherein when the voltage of the battery reduces to a predetermined value, the switch circuit is turned on and controls the warning circuit to alarm.

4. The weak battery warning circuit as claimed in claim 3, further comprises a jumper connected between the second terminal of the switch circuit and the battery for enabling a user to stop the alarm by setting the jumper open.

5. A circuit assembly for a computer, comprising:
   a standby voltage terminal configured for providing a standby voltage from said computer to a real-time clock of said computer via a power supply circuit;
   a battery connected to said real-time clock via said power supply circuit, configured for providing power to said power supply circuit for further use when said standby voltage is not supplied to said real-time clock, wherein said power supply is configured for selecting one of said battery and said standby voltage to provide power to said real-time clock;
   a warning circuit for generating an alarm based on acceptance of a control signal; and
   a controlling circuit electrically connectable between said battery and said warning circuit, said controlling circuit comprising a switch used to generate said control signal to said warning circuit when said switch accepts a voltage signal from said battery indicating a current voltage status of said battery and a preset voltage signal, and said switch is responsive to a comparative result of said voltage signal from said battery and said preset voltage signal in order to generate said control signal for said warning circuit.

6. The circuit assembly as claimed in claim 5, wherein said switch of said controlling circuit is a transistor, said transistor includes a base connected to said battery to receive said voltage signal from said battery, an emitter connected to an input voltage, and a collector connected to ground and also connected to the warning circuit to provide said control signal.

7. The circuit assembly as claimed in claim 5, wherein said controlling circuit further comprises a jumper electrically connectable between said battery and said switch in order to enable/disable said controlling circuit.

* * * * *